US011519196B2

(12) United States Patent
Amante et al.

(10) Patent No.: US 11,519,196 B2
(45) Date of Patent: Dec. 6, 2022

(54) UTILITY DOOR HANDLE ASSEMBLY (71) Applicant: Bell Textron Inc., Fort Worth, TX (US)

(72) Inventors: William Anthony Amante, Grapevine, TX (US); Arunkumar Koppa Siddalingappa, Bangalore (IN); Darpan Bansal, New Delhi (IN)

(73) Assignee: TEXTRON INNOVATIONS INC., Providence, RI (US)

( * ) Notice: Subject to any disclaimer, the term of this patent is extended or adjusted under 35 U.S.C. 154(b) by 254 days.

(21) Appl. No.: 16/915,322

(22) Filed: Jun. 29, 2020

(65) Prior Publication Data
US 2021/0363782 A1 Nov. 25, 2021

(30) Foreign Application Priority Data

May 21, 2020 (IN) .............................. 202021021435

(51) Int. Cl.
*E05B 7/00* (2006.01)
*B64C 1/14* (2006.01)

(52) U.S. Cl.
CPC . *E05B 7/00* (2013.01); *B64C 1/14* (2013.01)

(58) Field of Classification Search
CPC .......... E05B 7/00; E05B 85/10; E05B 85/103; E05B 85/14; E05B 2001/0076; E05B 79/06; E05B 1/0015; E05B 2001/0023; E05B 5/00; E05B 5/006; Y10S 292/31; Y10S 16/464; Y10S 16/473; Y10S 16/513; Y10S 16/515; B64C 1/14; A47B 95/02

USPC ................ 292/1, 336.3; 244/129.1; 16/110.1
See application file for complete search history.

(56) References Cited

U.S. PATENT DOCUMENTS

| 3,265,168 | A  | * | 8/1966  | Erhard ................... | A45C 13/26 190/117 |
| 4,189,037 | A  | * | 2/1980  | Szabo .................... | A45C 13/26 190/115 |
| 4,487,440 | A  | * | 12/1984 | Beijer ..................... | E05B 5/003 292/DIG. 31 |
| 6,499,187 | B2 | * | 12/2002 | Hollingsworth ....... | A45C 13/26 16/DIG. 18 |
| 6,827,235 | B2 | * | 12/2004 | Androsyuk ........... | B65H 31/22 271/181 |
| 8,047,583 | B2 | * | 11/2011 | Clausen ................. | E05B 13/00 244/129.1 |
| 10,087,664 | B2 | * | 10/2018 | Auriac ..................... | E05C 5/04 |
| 2020/0199920 | A1 | * | 6/2020 | Savidge ............... | E05B 85/103 |

FOREIGN PATENT DOCUMENTS

CN 111140080 A * 5/2020

* cited by examiner

*Primary Examiner* — Kristina R Fulton
*Assistant Examiner* — Emily G. Brown
(74) *Attorney, Agent, or Firm* — Akona IP PC (57) ABSTRACT

A handle assembly for an access panel is described and includes a center body portion; first and second handles rotatably connected to the center body portion such that the handles are rotatable toward each other to a first position and away from each other to a second position; and a gear assembly for connecting the first and second handles to the center body portion.

20 Claims, 7 Drawing Sheets

UTILITY DOOR HANDLE ASSEMBLY

FOREIGN APPLICATION CLAIM OF PRIORITY

This application claims the benefit of priority under 35 U.S.C. 119(b) to Indian National Phase Patent Application Serial No. 202021021435 entitled, "UTILITY DOOR HANDLE ASSEMBLY," filed on 21 May 2020. The disclosure of this prior application is considered part of (and is incorporated by reference in) the disclosure of this application.

TECHNICAL FIELD

This disclosure relates in general to the field of aircraft and, more particularly, though not exclusively, to a utility door handle assembly for such aircraft.

BACKGROUND

Aircraft typically have provided on exterior surfaces thereof doors or access panels for enabling access to an aircraft interior. Such doors or panels are often very large and therefore benefit from having handles disposed thereon to facilitate removal of the door/panel from and installation of the door/panel on the aircraft; however, handles extending from an exterior surface of an aircraft result in added aerodynamic drag during flight.

SUMMARY

One embodiment is a handle assembly for an access panel including a center body portion; first and second handles rotatably connected to the center body portion such that the handles are rotatable toward each other to a first position and away from each other to a second position; and a gear assembly for connecting the first and second handles to the center body portion.

Another embodiment is an access panel including at least one handle assembly connected to the access panel, the at least one handle assembly comprising a center body portion; first and second handles rotatably connected to the center body portion such that the handles are rotatable toward each other to a first position and away from each other to a second position; and a gear assembly for connecting the first and second handles to the center body portion.

Yet another embodiment is an aircraft comprising an access panel; and a handle assembly secured to the access panel, the handle assembly comprising a center body portion; first and second handles rotatably connected to the center body portion such that the handles are rotatable toward each other to a first position and away from each other to a second position; and a gear assembly for connecting the first and second handles to the center body portion.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is a utility door handle assembly having a specialty design for connection to a door or access panel (hereinafter collectively referred to as a "door") of an aircraft, for example. In accordance with features of embodiments described herein, the utility door handle assembly is designed such that, in a neutral position, it resembles a dragonfly and is painted accordingly to accentuate the resemblance. In particular, the utility door handle assembly includes a left side hand grip portion and a right side hand grip portion that are interconnected by gears such that moving one of the grip portions toward the center of the handle causes the other one of the grip portions to move toward the center as well. Torsion springs automatically push both of the hand grip portions to rest against the surface of the door on their respective sides such that the hand grip portions are close to flush with the skin of the door to minimize aerodynamic drag. A pair of mating bosses and pockets may be provided in the inside of the hand grip portions to lock the hand grip portions together when they are in use. These features eliminate load on the gears when the handle tends to "swing" in the forward/aft direction. The design is modular, as the support fittings may be easily modified to any support structure, such that the design's application is not limited to doors and access panels.

Figure 1:
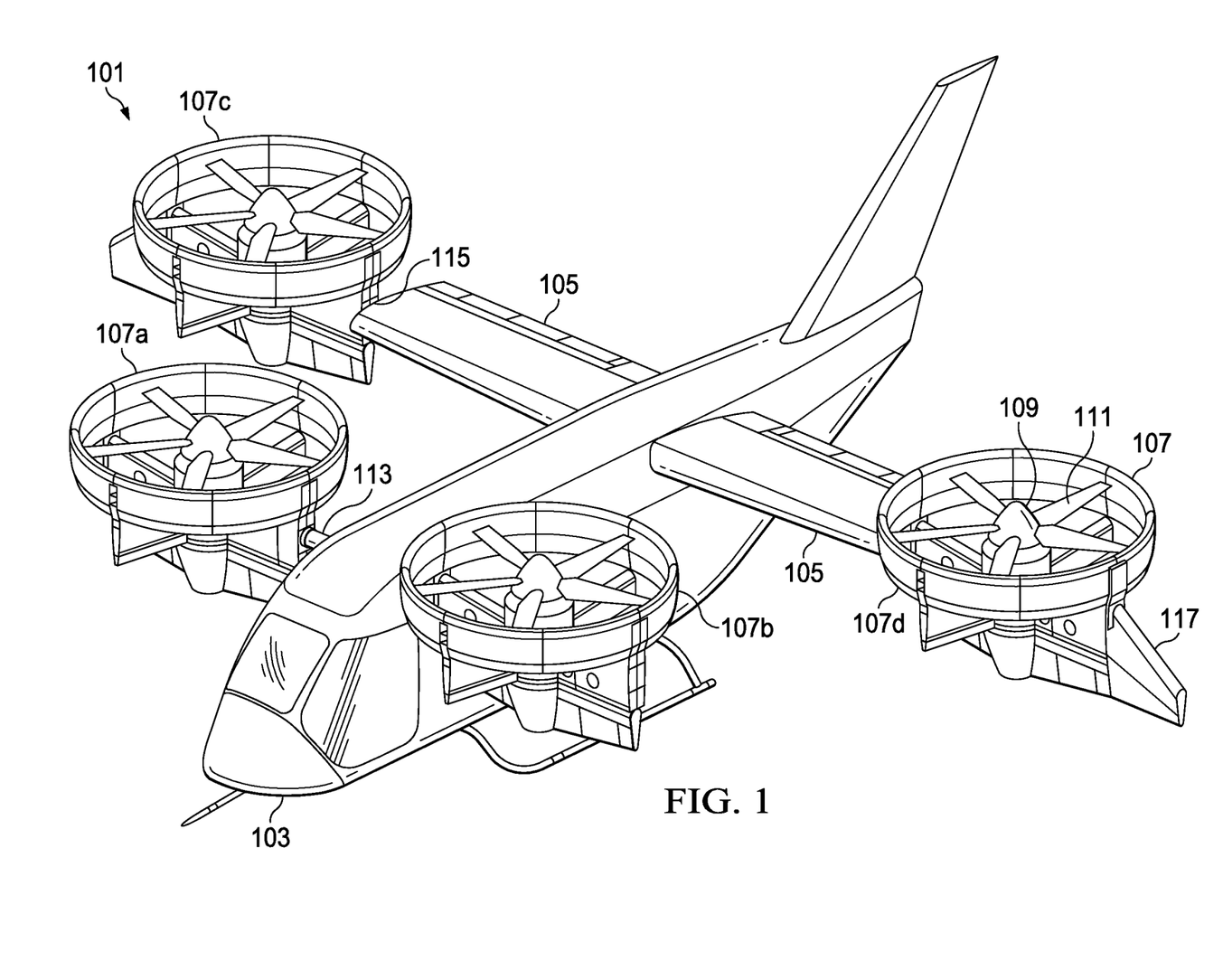
FIGS. 1 and 2 illustrate an example tiltrotor aircraft in which a utility door handle assembly in accordance with embodiments described herein may be implemented and showing the aircraft configured to operate in a helicopter mode and an airplane mode, respectively.
Figure 2:
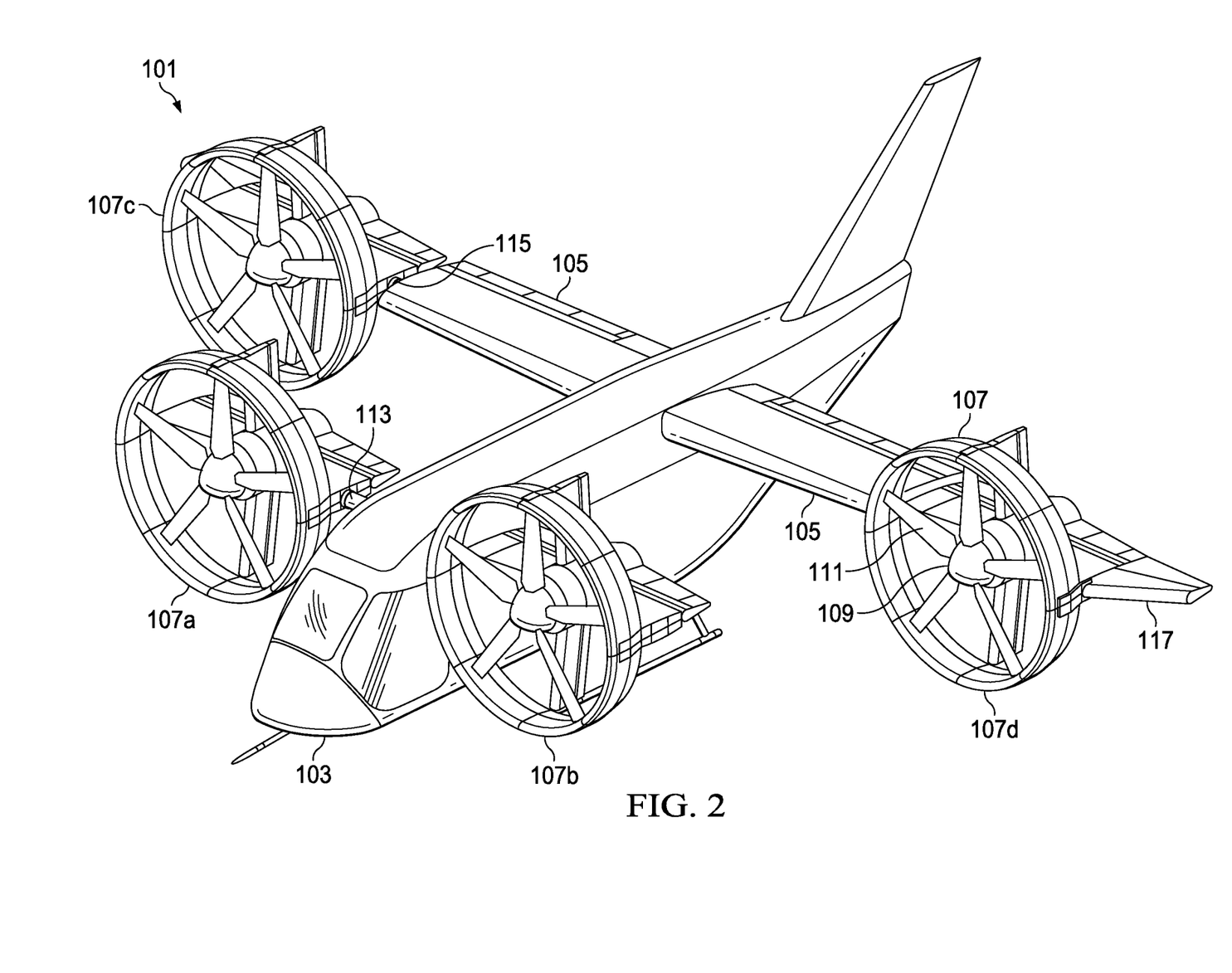

FIGS. 1 and 2 illustrate an example tiltrotor aircraft 101 that includes ducted rotors (or fans). The tiltrotor aircraft 101 is convertible between a helicopter mode (shown in FIG. 1), which allows for vertical takeoff and landing, hovering, and low speed directional movement, and an airplane mode (shown in FIG. 2), which allows for forward flight as well as horizontal takeoff and landing.

Aircraft 101 comprises a fuselage 103 with a fixed wing 105 that extends therefrom and a plurality of rotatable ducts 107. Each duct 107 houses a power plant for driving an attached rotor 109 in rotation. Each rotor 109 has a plurality of blades 111 configured to rotate within ducts 107.

In the illustrated embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a respective spindle 113. Ducts 107c and 107d are each independently coupled to a corresponding end of wing 105 via a respective spindle 115. As shown, each of ducts 107c and 107d includes a winglet 117 that is coupled thereto. It should be appreciated that aircraft 101 is not limited to the illustrated configuration having four ducts 107, and that aircraft 101 may alternatively be implemented with more or fewer ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight. In particular, in airplane mode, ducts 107 direct their respective thrusts in the aft direction to propel aircraft 101. Aircraft 101 is operable to fly in all directions during the vertical takeoff and landing (i.e., helicopter) mode configuration of FIG. 1, although faster forward flight is achievable while in the forward flight (i.e., airplane) mode configuration of FIG. 2. Ducted fans 107 may be tiltable between the vertical and horizontal positions by spindles 113, 115, which are rotatable in response to commands originating from a pilot and/or a flight control system of the aircraft 101.

Figure 3:
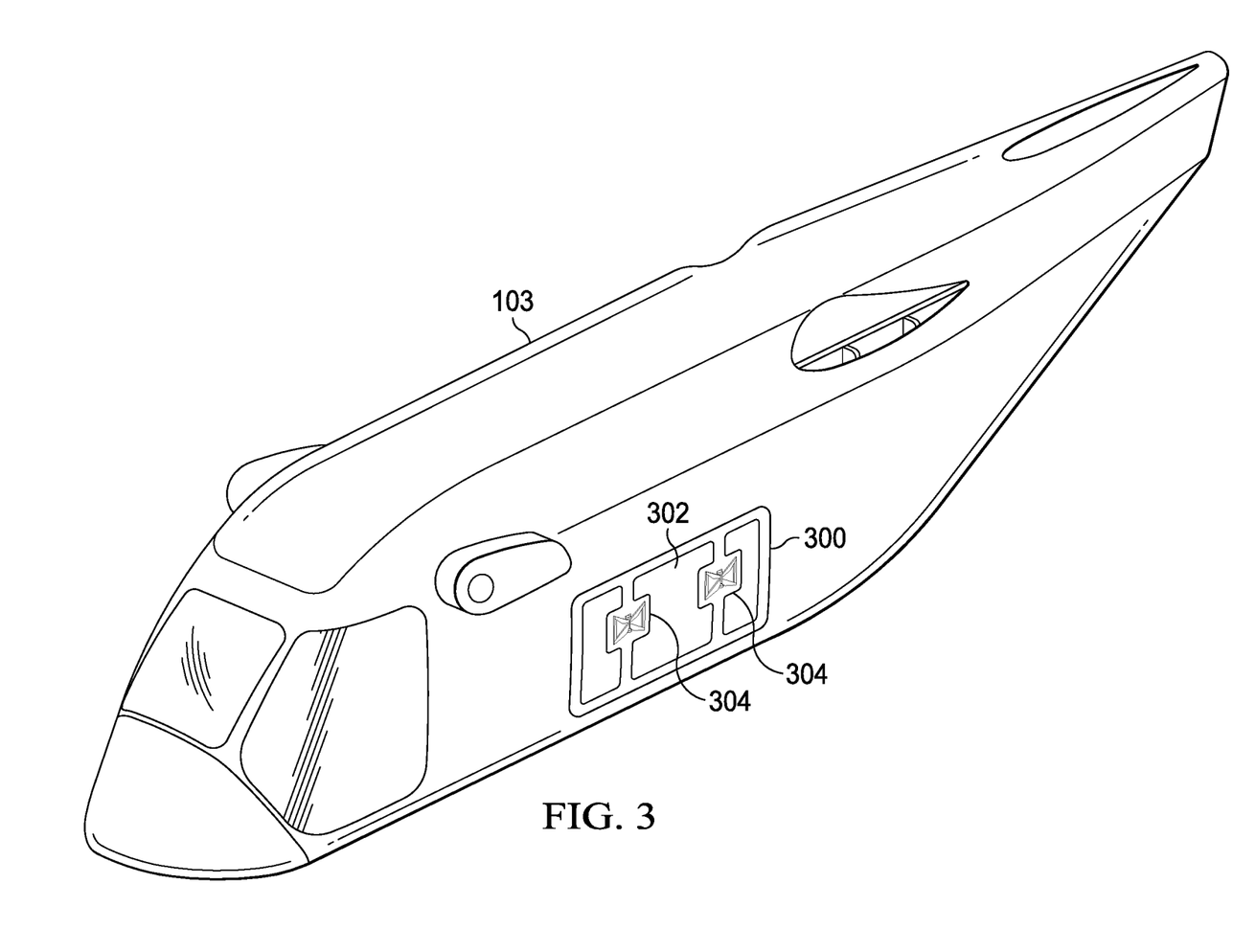
FIG. 3 is an illustration of the tiltrotor aircraft of FIGS. 1 and 2 with the wing and rotors removed to facilitate illustration and explanation of the utility door handle assembly with in accordance with embodiments described herein.

FIG. 3 illustrates the fuselage 103 of the aircraft 101 so that a door, or access panel, 300 is more clearly visible. In certain embodiments, door 300 covers an opening in skin 302 of the fuselage 103; therefore, removing the door 300 provides access to the opening and thus into the fuselage. It will be recognized that, although not shown in FIG. 3, aircraft 101 may be provided with additional doors for accessing areas of the aircraft internal to the fuselage 103, for example. As shown in FIG. 3, door 300 is provided with utility door handle assemblies 304 embodying features that will be described in greater detail hereinbelow.

Figure 4:
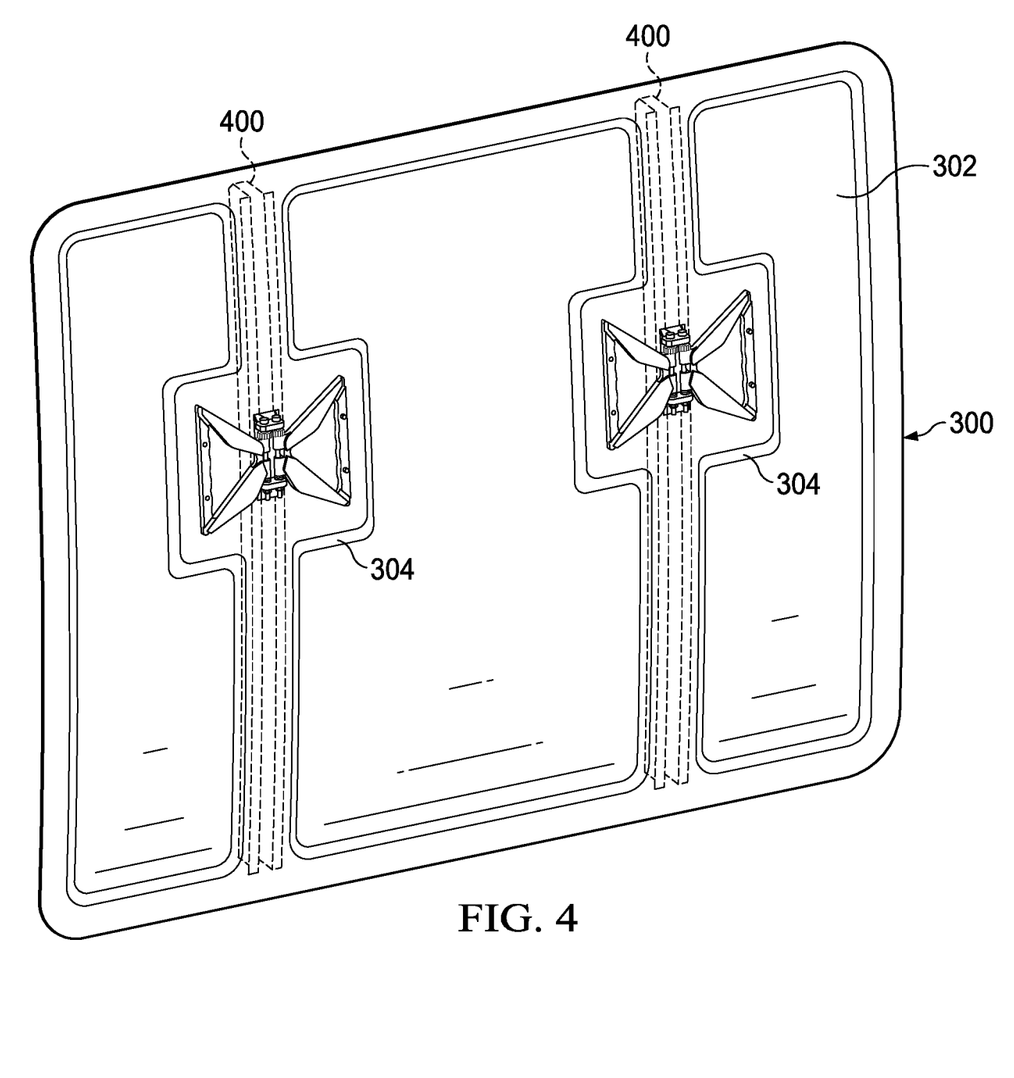
FIG. 4 illustrates a door panel for a tiltrotor aircraft to which a pair of utility door handle assemblies in accordance with embodiments described herein are connected.

FIG. 4 is a more detailed view of the door 300 with the handles 304 attached. In one embodiment, as shown in FIG. 4, door 300 includes channels 400 (in particular, C-channels) in which handles 304 may be attached and/or secured, as will be described in greater detail below. Channels 400 may be made from aluminum and may be standard extrusions or machined parts. In certain embodiments, channels comprise a support structure for the door panel for providing additional stiffness.

It will be recognized that, while handles 304 are useful and/or necessary for removing the door 300 from the fuselage 103 and returning the door to the fuselage, during flight of the aircraft 101, the handles result in increased aerodynamic drag. Therefore, the fact that handles 304 may be selectively extended from the door 302 (or opened) when needed and easily retracted or stowed in the door 300 (or closed) when not in use and/or when the aircraft 101 is in flight is highly beneficial.

Figure 5:
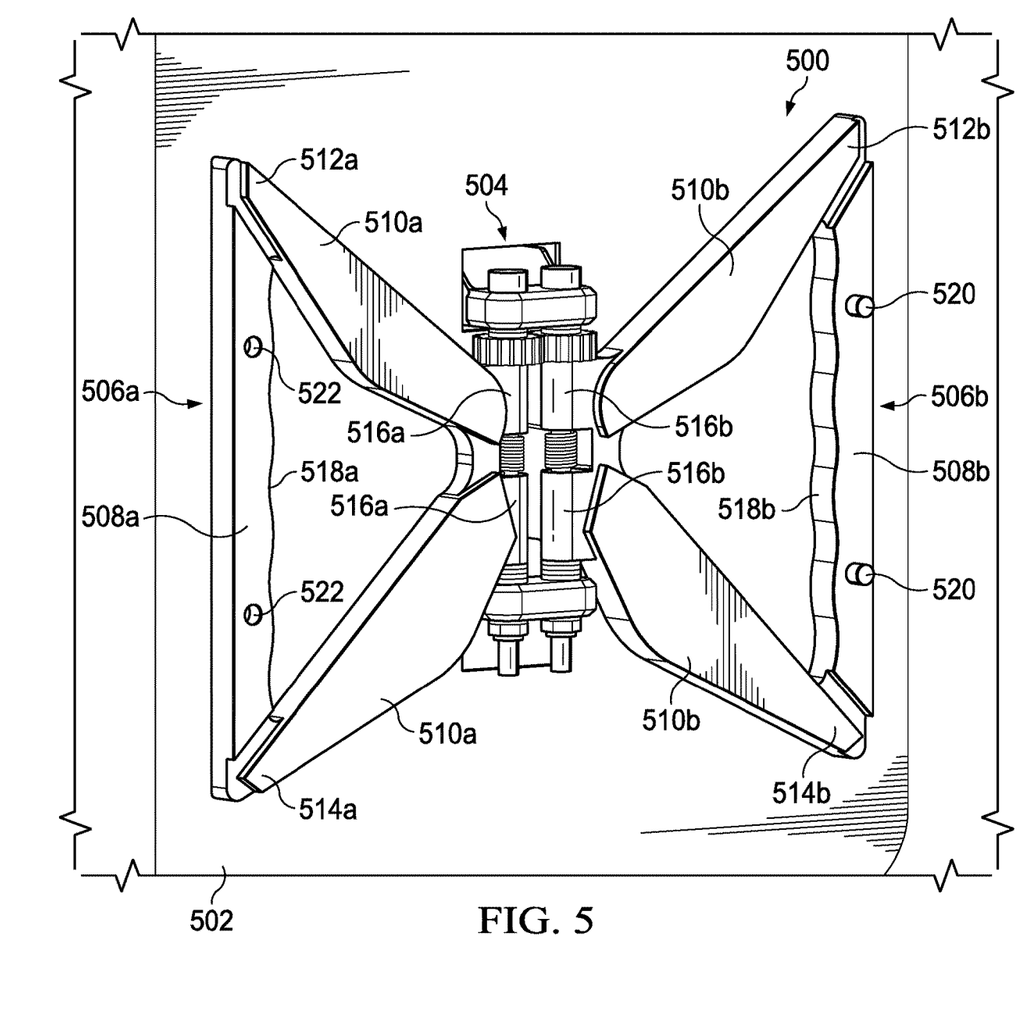
FIG. 5 illustrates a more detailed view of a utility door handle assembly in accordance with embodiments described herein showing the assembly in a closed position.

FIG. 5 is a more detailed view of a utility door handle assembly having a specialty design 500 (which may be used to implement handle assemblies 304) connected to a door 502 (which may correspond to door 300) in accordance with features of embodiments described herein. As shown in FIG. 5, the handle assembly 500 is in a neutral, or open, position, and includes a center body portion 504 and two side portions, or handles, including a left hand (LH) portion 506a and a right hand (RH) portion 506b. Each side portion, or handle, 506a, 506b, includes a respective hand grip portion 508a, 508b, that may be grasped by a user during removal and/or installation of the door 502, as described in greater detail hereinbelow. Side portions 506a, 506b, further include connector portions 510a, 510b, for rotatably connecting hand grip portions 508a, 508b, to the center body portion 504. In particular, connector portions 510a, 510b, are fixedly connected to opposite ends of hand grip portions 508a, 508b, at connection points 512a, 512b, 514a, 514b, and rotatably connected to the center body portion 504 at connection points 516a, 516b, in a manner that will be described in greater detail below.

Figure 6:
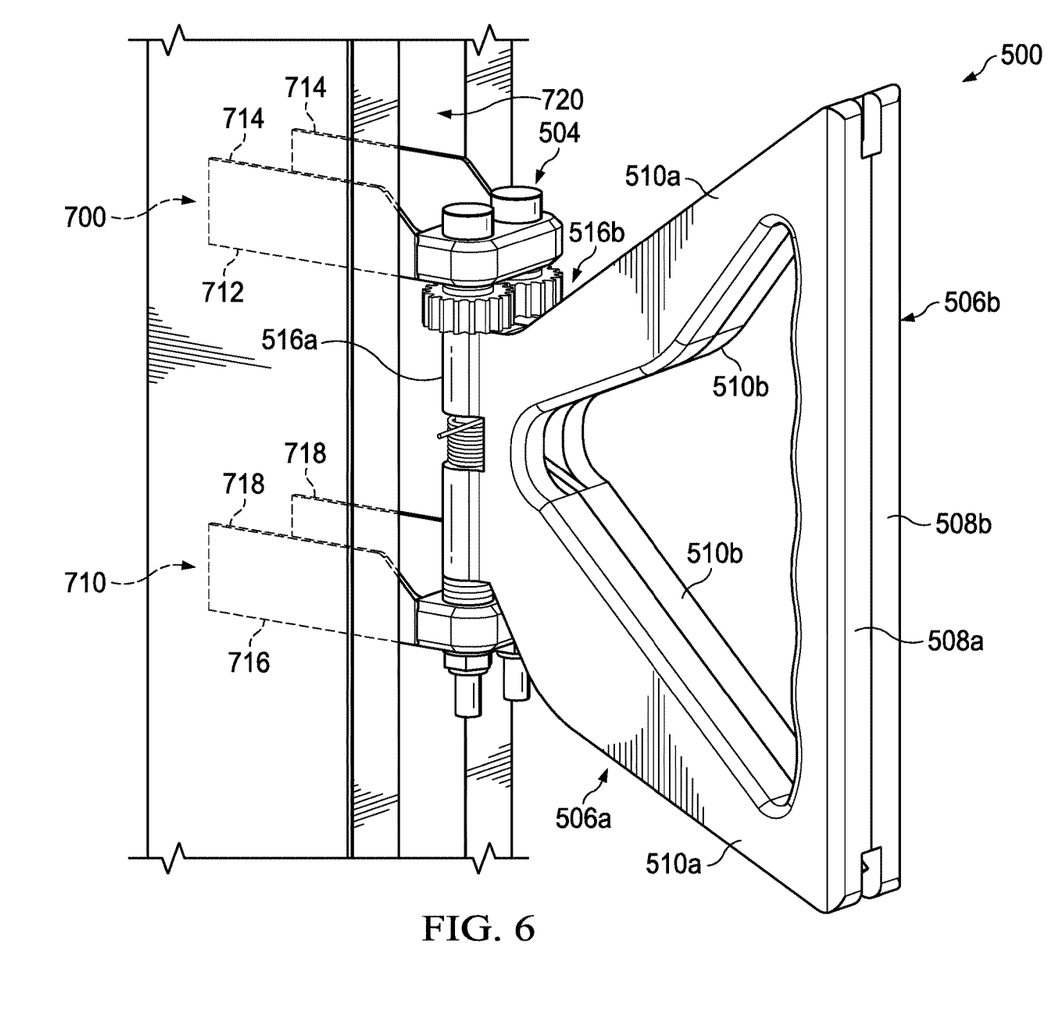
FIG. 6 illustrates the utility door handle assembly of FIG. 5 in an open position.

As shown in FIG. 5, in certain embodiments, ergonomic features 518a, 518b, comprising indentations may be provided on an interior face of hand grip portions 508a, 508b, for accommodating the user's fingers, rendering the grip portions 508a, 508b, easier and more comfortable to grasp, especially when the door handle assembly 500 is in an open position, as illustrated in FIG. 6.

As will be described in greater detail hereinbelow, side portions 506a, 506b, are connected to center body portion 504 in such a manner that each of the side portions rotates about a respective axis parallel to a longitudinal axis of the center body portion 504 toward one another until they meet in the middle, forming a ninety degree angle with a face of the door 502. To this end, bosses 520 are provided on a front surface of one of the hand grip portions (e.g., the RH grip portion 508b), and corresponding pockets 522 are provided on a front surface of the other one of the hand grip portions (e.g., the LH grip portion 508a) such that when the two hand grip portions 508a, 508b, meet, as shown in FIG. 6, the bosses 520 interlock, or mate, with the corresponding pockets 522 for purposes that will be described below. It will be recognized that other types of interlocking features may be substituted for bosses 520 and pockets 522 as desired or required by a particular application. Additionally, although two sets of bosses 520/pockets 522 are shown in FIG. 5, more or fewer sets may be provided. Still further, "male" (e.g., bosses) and "female" (e.g., pockets) interlocking features may be combined on a single side portion, with corresponding features disposed on the opposite side portion. Mating features are provided to eliminate load on the gears (described below) when the handle assembly 500 tends to "swing" in the forward/aft direction.

In particular, while the door is held with the handles, it can swing in in the forward/aft direction with reference to the handles. The swing is prevented by the gears, as the handles cannot move in the same direction without breaking the gears. Therefore, the swing will be prevented if the gears are strong enough. Still there will be a little swing because of the gear's backlash. The bosses and protrusions, when engaged with one another, assist in eliminating the remaining swing, as they prevent the handles from moving together and/or slipping past one another. This is due to the fact that, for the handles to swing, the bosses and protrusion would have to misalign, which is not possible without breaking the boss. It should be noted that the backlash of the gears, while the handles are moving towards each other, will not be prevented by the bosses/protrusions; the bosses/protrusions eliminate the swing due to the backlash of the gears.

Referring now to FIG. 6, illustrated therein is the handle assembly 500 in a closed, or active, position. Specifically, as shown in FIG. 6, the hand grip portions 508a, 508b, have been drawn completely together and the bosses and pockets (not visible in FIG. 6) engage, or interlock with, one another such that the two hand grip portions 508a, 508b, combine to form a single integrated handle.

Figure 7:
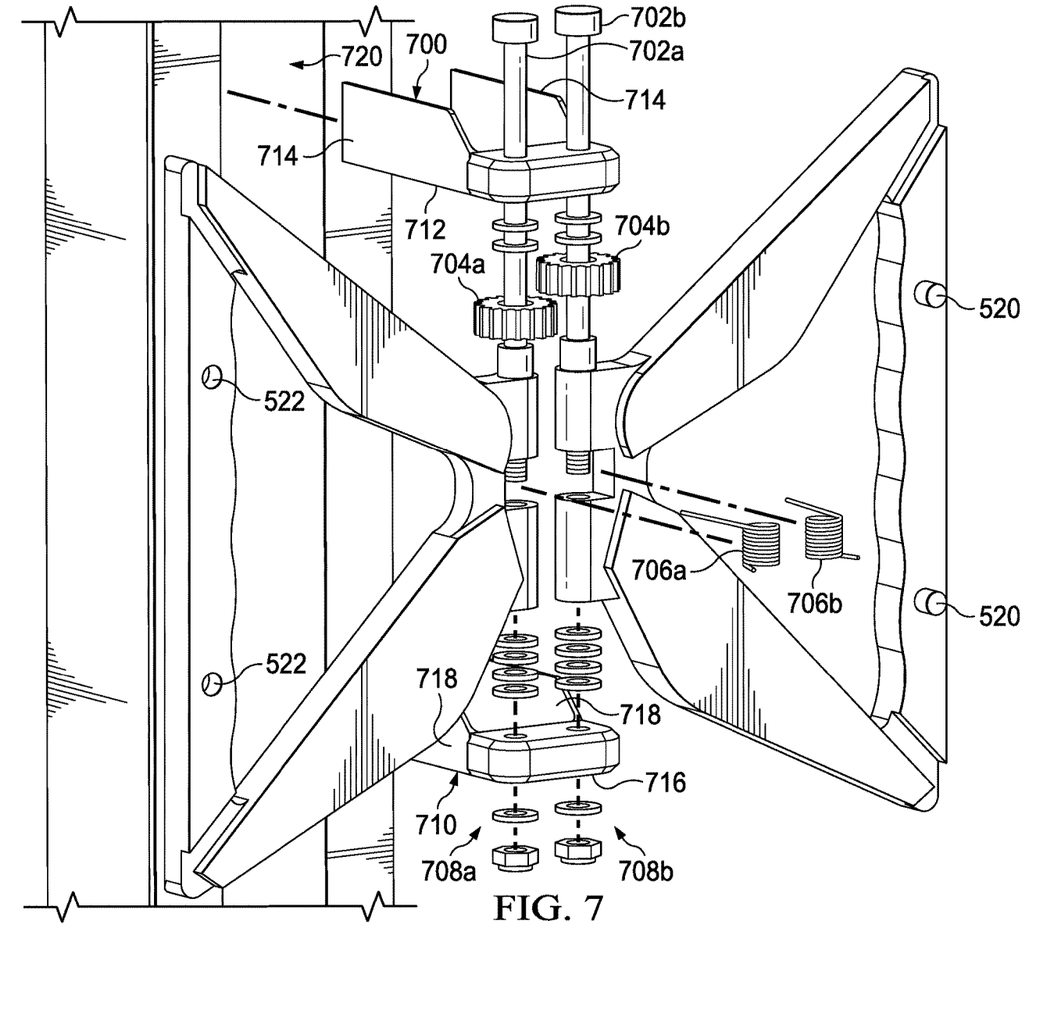
FIG. 7 is an exploded view of the utility door handle assembly of FIG. 5.

FIG. 7 illustrates an exploded view of the handle 500 illustrating the interworkings thereof that operate to provide the functions described herein. As shown in FIG. 7, the body portion 506 includes an upper support 700, pins 702a, 702b, gears 704a, 704b, torsion springs 706a, 706b, pin connection means 708a, 708b, and a lower support 710. Pins 702a, 702b, are fixedly connected to connector portions 510a, 510b, and rotatably connected at opposite ends to upper and lower supports 700, 710, such that side portions 506a, 506b, may rotate about a longitudinal axis of the respective one of the pins 702a, 702b. In the illustrated embodiment, pins 702a, 702b, extend through holes in the supports 700, 710, with pin heads 712a, 712b, securing one end of the pins at support 700 and pin connection means 708a, 708b, securing the opposite end of the pins at support 710.

Referring now to FIGS. 6 and 7 collectively, torsion springs 706a, 706b, function to bias side portions 506a, 506b, against the face, or skin, of the door 502; i.e., the springs 706a, 706b, bias the assembly 500 toward the closed position, as illustrated in FIG. 5. As shown in FIG. 6, gears 704a, 704b, are associated with pins 702a, 702b, and arranged such that rotational movement of one of the side portions 506a, 506b, about the longitudinal axis of the respective one of the pins 702a, 702b, toward the center of the assembly 500 translates into corresponding rotational movement of the other one of the side portions about the longitudinal axis of the other one of the pins in the opposite direction (i.e., toward the center of the assembly), such that the grip portions 508a, 508b, meet in the middle, as shown FIG. 6. In this manner, the assembly 500 may be operated with only one hand, with a user grasping one or the other of hand grip portions 508a, 508b, of one of the side portions 506a, 506b, and drawing it toward the center of the assembly 500, causing the opposite side portion to corresponding rotate toward the center body portion 504 until the two hand grip portions 508a, 508b, meet in the middle. When the hand grip portions 508a, 508b, are released, the torsion springs 706a, 706b, return the side portions 506a, 506b, to the neutral (closed) position (FIG. 5).

Support 700 may be implemented as a C-channel comprising a web 712 and flanges 714. Similarly, support 710 may be implemented as a C-channel comprising a web 716 and flanges 718. Supports 700, 710, may be substantially identical to one another in most relevant respects. In some embodiments, supports 700, 710, are disposed within a channel 720 provided in the door 502, such that outer faces of flanges 714, 718, are in contact with and secured in an appropriate manner to inside faces of flanges of channel 700. In other embodiments, supports 700, 710, may replace the channel 720 and flanges 714, 718, may extend into the surface of the door 502 to be secured in an appropriate manner. Supports 700, 710, may also be integrated into the channel 720. Still further, supports 700, 710, may be directed to the door directly, in which case a doubler may be required at the point of connection to increase the stiffness to an appropriate level.

All or part of the channel 720 that does not coincide with supports 700, 710, may be covered by the skin of the door 502.

The dimensions (e.g., height of the flanges 714, 718, and width of the webs 712, 716) of the supports 700, 710, are such that, when the handle assembly 500 is installed on the door 502 (whether or not within the channel 720), the center body portion 504 lies flush against the skin of the door and side portions 506a, 506b, rest against the door skin when in a closed position (biased by the torsion springs 706a, 706b), thereby to minimize aerodynamic drag when the aircraft on which the door 502 is disposed is in flight.

It should be appreciated that aircraft illustrated herein, such as aircraft 101, is merely illustrative of a variety of aircraft that can implement the embodiments disclosed herein. Indeed, the various embodiments of the electric drive system line replaceable unit described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. As such, those skilled in the art will recognize that the embodiments described herein for an electric drive system line replaceable unit can be integrated into a variety of aircraft configurations. It should be appreciated that even though aircraft are particularly well-suited to implement the embodiments of the present disclosure, non-aircraft vehicles and devices can also implement the embodiments.

Example 1 includes a handle assembly for an access panel comprising a center body portion; first and second handles rotatably connected to the center body portion such that the handles are rotatable toward each other to a first position and away from each other to a second position; and a gear assembly for connecting the first and second handles to the center body portion.

In Example 2, the handle assembly of Example 1 may further include the gear assembly producing a corresponding rotational movement of a first one of the first and second handles in response to a rotational movement of the other one of the first and second handles.

In Example 3, the handle assembly of any of Examples 1-2 may further include the gear assembly preventing the first and second handles from rotating in the same direction at the same time.

In Example 4, the handle assembly of any of Examples 1-3 may further include a front face of the first handle including at least one boss and a front face of the second handle including at least one pocket corresponding to the at least one boss such that when the handles are in the first position, the at least one boss is received within the at least one pocket.

In Example 5, the handle assembly of any of Examples 1-4 may further include means for securing the center body portion to the access panel.

In Example 6, the handle assembly of any of Examples 1-5 may further include at least one torsion spring for biasing the at least one of the first and second handles to the second position.

In Example 7, the handle assembly of any of Examples 1-6 may further include, in the first position, the first and second handles extending perpendicularly from a front surface of the access panel and in the second position, the first and second handles lying substantially flat against the front surface of the access panel on opposite sides of the center body.

Example 8 is an access panel including at least one handle assembly connected to the access panel, the at least one handle assembly comprising a center body portion; first and second handles rotatably connected to the center body portion such that the handles are rotatable toward each other to a first position and away from each other to a second position; and a gear assembly for connecting the first and second handles to the center body portion.

In Example 9, the access panel of Example 8 includes the gear assembly producing a corresponding rotational movement of a first one of the first and second handles in response to a rotational movement of the other one of the first and second handles.

In Example 10, the access panel of any of Examples 8-9 may further include the gear assembly preventing the first and second handles from rotating in the same direction at the same time.

In Example 11, the access panel of any of Examples 8-10 may further include a front face of the first handle including at least one boss and a front face of the second handle including at least one pocket corresponding to the at least one boss such that when the handles are in the first position, the at least one boss is received within the at least one pocket.

In Example 12, the access panel of any of Examples 8-11 may further include means for securing the center body portion to the access panel.

In Example 13, the access panel of any of Examples 8-12 may further include at least one torsion spring for biasing the at least one of the first and second handles to the second position.

In Example 14, the access panel of any of Examples 8-13 may further include, in the first position, the first and second handles extending perpendicularly from a front surface of the access panel and in the second position, the first and second handles lying substantially flat against the front surface of the access panel on opposite sides of the center body.

Example 15 is an aircraft including an access panel; and a handle assembly secured to the access panel, the handle assembly comprising a center body portion; first and second handles rotatably connected to the center body portion such that the handles are rotatable toward each other to a first position and away from each other to a second position; and a gear assembly for connecting the first and second handles to the center body portion.

In Example 16, the aircraft of Example 15 may further include the gear assembly producing a corresponding rotational movement of a first one of the first and second handles in response to a rotational movement of the other one of the first and second handles.

In Example 17, the aircraft of any of Examples 15-16 may further include the gear assembly preventing the first and second handles from rotating in the same direction at the same time.

In Example 18, the aircraft of any of Examples 15-17 may further include a front face of the first handle including at least one boss and a front face of the second handle including at least one pocket corresponding to the at least one boss such that when the handles are in the first position, the at least one boss is received within the at least one pocket.

In Example 19, the aircraft of any of Examples 15-18 may further include at least one torsion spring for biasing the at least one of the first and second handles to the second position.

In Example 20, the aircraft of any of Examples 15-17 may further include, in the first position, the first and second handles extending perpendicularly from a front surface of the access panel and in the second position, the first and second handles lying substantially flat against the front surface of the access panel on opposite sides of the center body.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, Ru, is disclosed, any number falling within the range is specifically disclosed. In particular, the following numbers within the range are specifically disclosed: R=RI+k*(Ru−RI), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A handle assembly for an access panel comprising:
 a center body having a first end and a second end opposite the first end and comprising first and second pins each extending from the first end of the center body to the second end of the center body;
 first and second handles each rotatably connected proximate to the first and second ends of the center body such that the handles are rotatable toward each other to a first position and away from each other to a second position; and
 a gear assembly for connecting the first and second handles to the center body at the first and second ends;
 wherein the center body is between the first and second handles; and
 wherein each of the handles comprises a hand grip portion and first and second connector portions extending from opposite ends of the hand grip portion; and
 wherein the first pin extends through the first and second connector portions of the first handle and the second pin extends through the first and second connector portions of the second handle to rotatably connect the first and second handles to the center body.

2. The handles assembly of claim 1 wherein the gear assembly produces a corresponding rotational movement of a first one of the first and second handles in response to a rotational movement of the other one of the first and second handles.

3. The handle assembly of claim 1, wherein the gear assembly prevents the first and second handles from rotating in the same direction at the same time.

4. The handle assembly of claim 1, wherein a front face of the first handle includes at least one boss and a front face of the second handle includes at least one pocket corresponding to the at least one boss such that when the handles are in the first position, the at least one boss is received within the at least one pocket.

5. The handle assembly of claim 1, wherein the center body is secured to the access panel via at least one support inserted into a C-channel in the access panel.

6. The handle assembly of claim 1 further comprising at least one torsion spring for biasing the at least one of the first and second handles to the second position.

7. The handle assembly of claim 1, wherein in the first position, the first and second handles extend perpendicularly from a front surface of the access panel and in the second position, the first and second handles lie substantially flat against the front surface of the access panel on opposite sides of the center body.

8. An access panel comprising:
first and second handle assemblies connected to a surface of the access panel, each of the handle assemblies comprising:
 a center body having a first end and a second end opposite the first end and comprising first and second pins each extending from the first end of the center body to the second end of the center body;
 first and second handles each rotatably connected to the first and second ends of the center body such that the handles are rotatable toward each other to a first position and away from each other to a second position; and
 a gear assembly for connecting the first and second handles to the center body at the first and second ends;
 wherein the center body is between the first and second handles; and
 wherein each of the handles comprises a hand grip portion and first and second connector portions extending from opposite ends of the hand grip portion; and
 wherein the first pin extends through the first and second connector portions of the first handle and the second pin extends through the first and second connector portions of the second handle to rotatably connect the first and second handles to the center body.

9. The access panel of claim 8, wherein for each of the handle assemblies, the gear assembly produces a corresponding rotational movement of one of the first and second handles in response to a rotational movement of the other one of the and second handles.

10. The access panel of claim 8, wherein for each of the handle assemblies, the gear assembly prevents the first and second handles from rotating in the same direction at the same time.

11. The access panel of claim 8, wherein for each of the handle assemblies, a front face of the first handle includes at least one boss and a front face of the second handle includes at least one pocket corresponding to the at least one boss such that when the handles are in the first position, the at least one boss is received within the at least one pocket.

12. The access panel of claim 8, wherein the center body of each of the handle assemblies is secured to the access panel via at least one support inserted into a C-channel in the access panel.

13. The access panel of claim 8 further comprising, for each of the handle assemblies, at least one torsion spring for biasing the at least one of the first and second handles to the second position.

14. The access panel of claim 8, wherein, for each of the handle assemblies, in the first position, the first and second handles extend perpendicularly from a front surface of the access panel and in the second position, the first and second handles lie substantially flat against the front surface of the access panel on opposite sides of the center body.

15. An aircraft comprising:
an access panel; and
a handle assembly secured to the access panel, the handle assembly comprising:
 a center body having a first end and a second end opposite the first end and comprising first and second pins each extending from the first end of the center body to the second end of the center body;
 first and second handles each rotatably connected to the first and second ends of the center body such that the handles are rotatable toward each other to a first position and away from each other to a second position; and
 a gear assembly for connecting the first and second handles to the center body at the first and second ends;
 wherein the center body is between the first and second handles; and
 wherein each of the handles comprises a hand grip portion and first and second connector portions extending from opposite ends of the hand grip portion; and
 wherein the first pin extends through the first and second connector portions of the first handle and the second pin extends through the first and second connector portions of the second handle to rotatably connect the first and second handles to the center body.

16. The aircraft of claim 15, wherein the gear assembly produces a corresponding rotational movement of one of the first and second handles in response to a rotational movement of the other one of the first and second handles.

17. The aircraft of claim 15, wherein the gear assembly prevents the first and second handles from rotating in the same direction at the same time.

18. The aircraft of claim 15, wherein a front face of the first handle includes at least one boss and a front face of the second handle includes at least one pocket corresponding to the at least one boss such that when the handles are in the first position, the at least one boss is received within the at least one pocket.

19. The aircraft of claim 15 further comprising at least one torsion spring for biasing the at least one of the first and second handles to the second position.

20. The aircraft of claim 15, wherein in the first position, the first and second handles extend perpendicularly from a front surface of the access panel and in the second position, the first and second handles lie substantially flat against the front surface of the access panel on opposite sides of the center body.

\* \* \* \* \*

UNITED STATES PATENT AND TRADEMARK OFFICE
CERTIFICATE OF CORRECTION

PATENT NO. : 11,519,196 B2
APPLICATION NO. : 16/915322
DATED : December 6, 2022
INVENTOR(S) : William Anthony Amante et al.

It is certified that error appears in the above-identified patent and that said Letters Patent is hereby corrected as shown below:

In the Claims

In Column 10, Line 66, in Claim 2, delete "The handles assembly of claim 1;" and insert -- The handle assembly of claim 1;" --, therefor.

In Column 11, Line 57, in Claim 9, delete "one of the and second handles" and insert -- one of the first and second handles --, therefor.

Signed and Sealed this
Thirty-first Day of January, 2023

*Katherine Kelly Vidal*

Katherine Kelly Vidal
*Director of the United States Patent and Trademark Office*